(12) United States Patent
Tessnow

(10) Patent No.: US 7,932,528 B2
(45) Date of Patent: Apr. 26, 2011

(54) SEGMENTED OPTIC

(75) Inventor: Thomas Tessnow, Weare, NH (US)

(73) Assignee: OSRAM SYLVANIA Inc., Danvers, MA (US)

( * ) Notice: Subject to any disclaimer, the term of this patent is extended or adjusted under 35 U.S.C. 154(b) by 873 days.

(21) Appl. No.: 11/653,752

(22) Filed: Jan. 16, 2007

(65) Prior Publication Data
US 2007/0115674 A1    May 24, 2007

Related U.S. Application Data

(63) Continuation-in-part of application No. 11/447,214, filed on Jun. 5, 2006, now Pat. No. 7,375,382.

(60) Provisional application No. 60/693,254, filed on Jun. 23, 2005, provisional application No. 60/693,999, filed on Jun. 24, 2005.

(51) Int. Cl.
*H01L 33/00* (2010.01)

(52) U.S. Cl. ............... 257/98; 257/99; 257/E33.067; 257/E33.072; 362/507; 362/511

(58) Field of Classification Search .............. 257/98, 257/99, E33.067, E33.072; 362/507, 511, 362/512, 514, 520
See application file for complete search history.

(56) References Cited

U.S. PATENT DOCUMENTS

| | | | |
|---|---|---|---|
| 7,375,382 B2 * | 5/2008 | Tessnow | 257/98 |
| 2003/0169160 A1 | 9/2003 | Barros et al. | |
| 2004/0264852 A1 * | 12/2004 | Tang | 385/31 |
| 2007/0139946 A1 | 6/2007 | Basile et al. | |

* cited by examiner

*Primary Examiner* — Minh-Loan T Tran
(74) *Attorney, Agent, or Firm* — William H. McNeill

(57) ABSTRACT

An optical light guide (30) comprises a base (32); a body (34) extending from the base along a longitudinal axis (36); and N light-emitting segments (38) extending laterally from the body (34), at least some of the N segments (38) being spaced a different distance from the base (32). The light guide (30) is constructed of a light-transmitting material, such as glass or acrylic, and can be clear or colored. In a preferred embodiment of the invention each of the segments (38) would extend a different distance from the base; however, the exact degree of separation would be dependent upon the curvature of surface with which the optic is to be utilized.

8 Claims, 3 Drawing Sheets

SEGMENTED OPTIC

CROSS-REFERENCE TO RELATED APPLICATIONS

This application is a continuation-in-part of Ser. No. 11/447,214, filed Jun. 5, 2006, now U.S. Pat. No. 7,375,382, issued May 20, 2008, which application claims priority from Provisional Applications Ser. No. 60/693,254, filed Jun. 23, 2005 and Ser. No. 60/693,999, filed Jun. 24, 2005.

TECHNICAL FIELD

The invention relates to optical light guides and more particularly to an optical light guide for use in a vehicle lamp assembly using LED light sources.

BACKGROUND ART

It is an industry standard that is treated as a necessity to make light sources as small as possible. This saves material costs, and can improve optical imaging. In competition with these needs, large fields areas may need to be illuminated, and with vehicle illumination, a substantial visual image is needed on the surface of the vehicle to mark the presence of the vehicle. These goals have been met in the past by the use of relatively large incandescent lamp and reflector systems. The advent of solid-state lighting has pointed in the direction of improving these systems by drastically reducing the size of the light source; however, there is still a need to spread beam-forming illumination over a broad area to better illuminate the vehicle. One successful approach to solving this problem is disclosed in the above-identified application and is shown in FIGS. 1 and 2 herein. Referring now to FIGS. 1 and 2, there is shown an optical light guide 10a that can be utilized with a replaceable lamp assembly 10. The light guide 10a comprises a substantially trumpet-shaped, rigid light transmissive body 12a having an input widow 14, a distal end 16, a front side 18, and a rear side 20. The light transmissive body 12a has a substantially smooth exterior surface on the front side 18 and a substantially clear and solid interior. A preferred material for the light guide body is a clear plastic.

The input window 14 transmits light received from the LEDs into the light transmissive body 12a and extends substantially transverse to a longitudinal axis 12c of the replaceable lamp assembly 10.

The light transmissive body 12a has a substantially constant thickness measured between the front side 18 and the rear side 20 and extends away from the input window 14 through an arc of from 60 to 120 degrees, with 90° being preferred, to an extension 21 that forms an output region 22 that extends towards the distal end 16.

The rear side 20 at least in the output region 22 is formed with a plurality of reflective steps 24 using total internal reflection to direct a portion of the intercepted light towards the front side 18.

The front side 18 of the output region 22 can be formed with refractive features directing light received from the reflective steps 24 in a desired direction.

The extension 21 of the output region 22 comprises about one third of the surface distance from the input window 14 to the distal end 16 while the entire length from the input window 14 to the distal end 16 is more than 10 times the average thickness.

A difficulty with the trumpet-shaped optic described above arises when the area beneath the optic, which typically is an automotive fender, comprises a more or less compound curve. It would, therefore, be an advance in the art if a suitable optic could be developed that is simple to construct and capable of matching or accommodating a complex curvature.

DISCLOSURE OF INVENTION

It is, therefore, an object of the invention to obviate the disadvantages of the prior art.

It is another object of the invention to enhance vehicle lighting.

These objects are accomplished, in one aspect of the invention, by the provision of an optical light guide comprising: a base; a body extending from the base along a longitudinal axis; and N light-emitting segments extending laterally from the body, at least some of the N segments being spaced a different distance from the base. The stepped segments allow the optic to follow complex curves while still maintaining-acceptable optical efficiency.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 3:
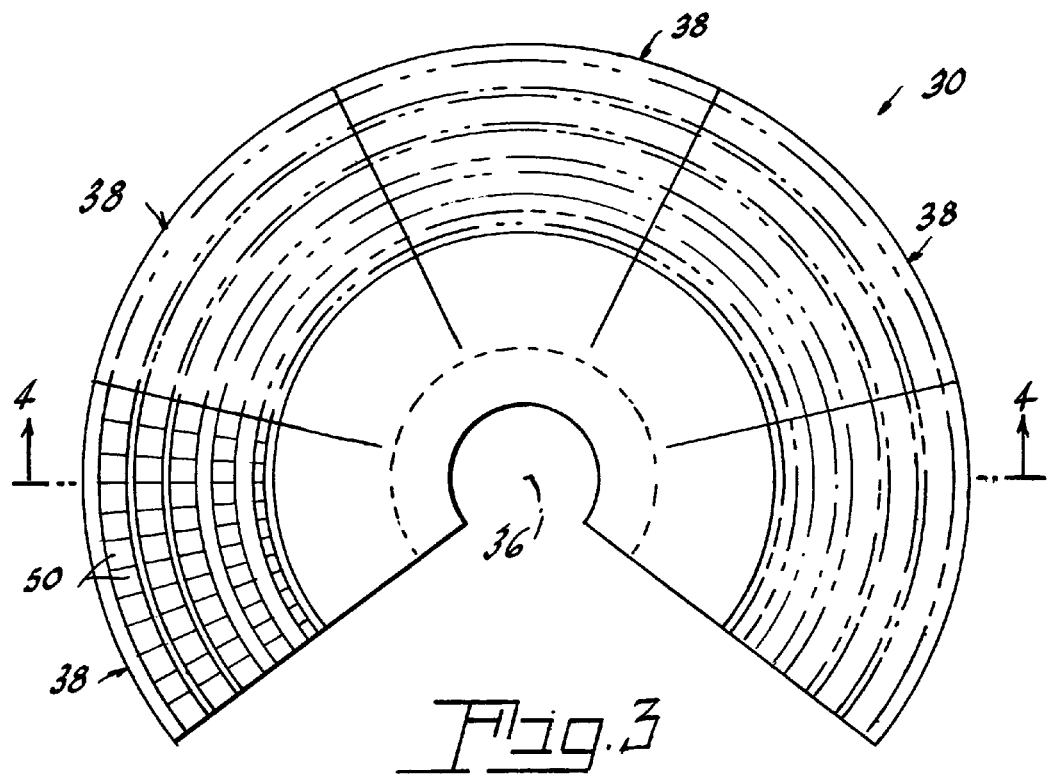
FIG. 3 is a plan view of an embodiment of the invention.
Figure 4:
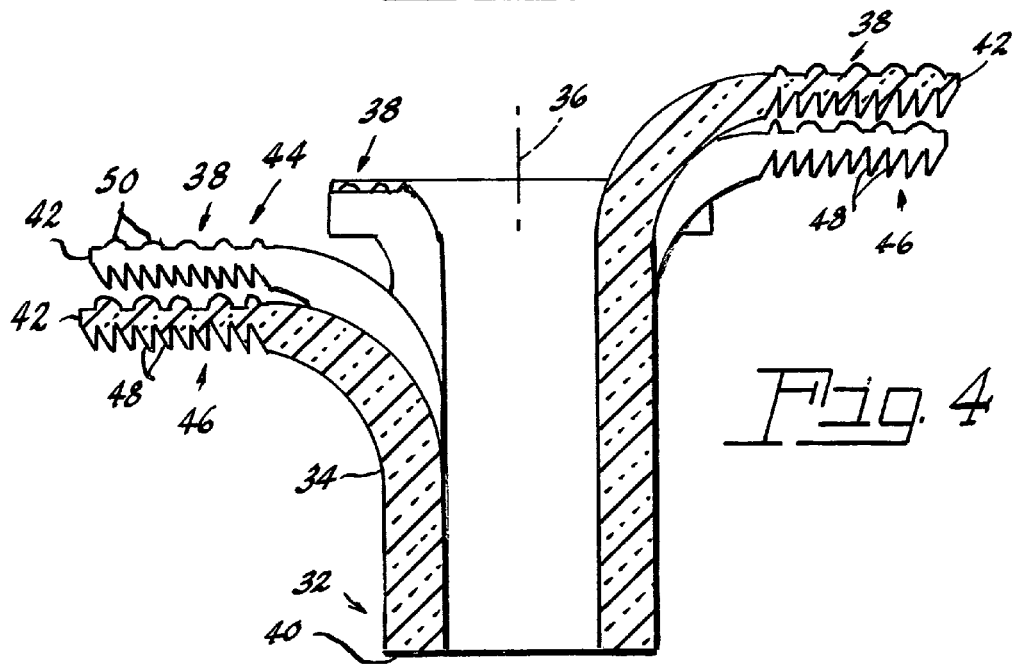
FIG. 4 is a sectional view taken along the line 44 of FIG. 3.
Figure 5:
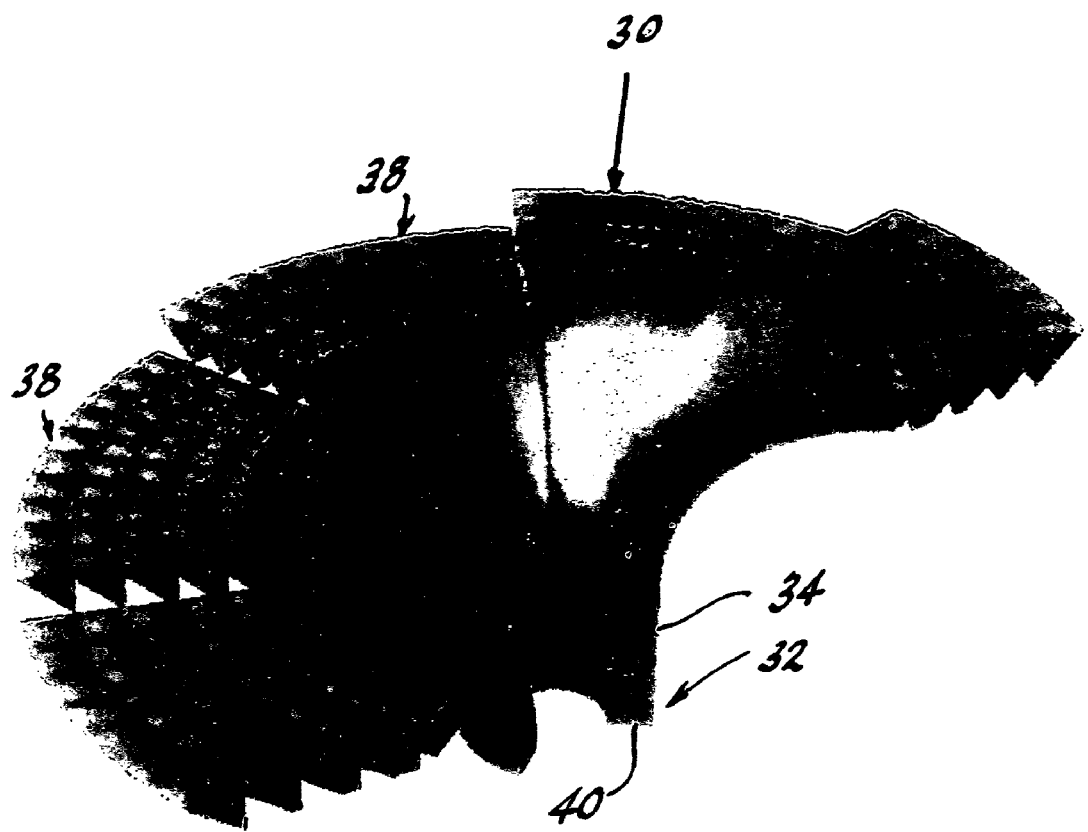
FIG. 5 is a perspective view of an embodiment of an optic of the invention.

Referring now to the drawings with greater particularity, there is shown in FIGS. 3 and 4 an optical light guide 30 comprising: a base 32; a body 34 extending from the base along a longitudinal axis 36; and N light-emitting segments 38 extending laterally from the body 34, at least some of the N segments 38 being spaced a different distance from the base 32. The light guide 30 is constructed of a light-transmitting material, such as glass or an acrylic, and can be clear or colored. In a preferred embodiment of the invention each of the segments 38 would extend a different distance from the base; however, the exact degree of separation would be dependent upon the curvature of the surface with which the optic is to be utilized. In any event, as shown the segments are all parallel to one another. The segments 38 extend away from the base 32 through an arc of from 60 to 120 degrees, with 90° being preferred.

Figure 1:
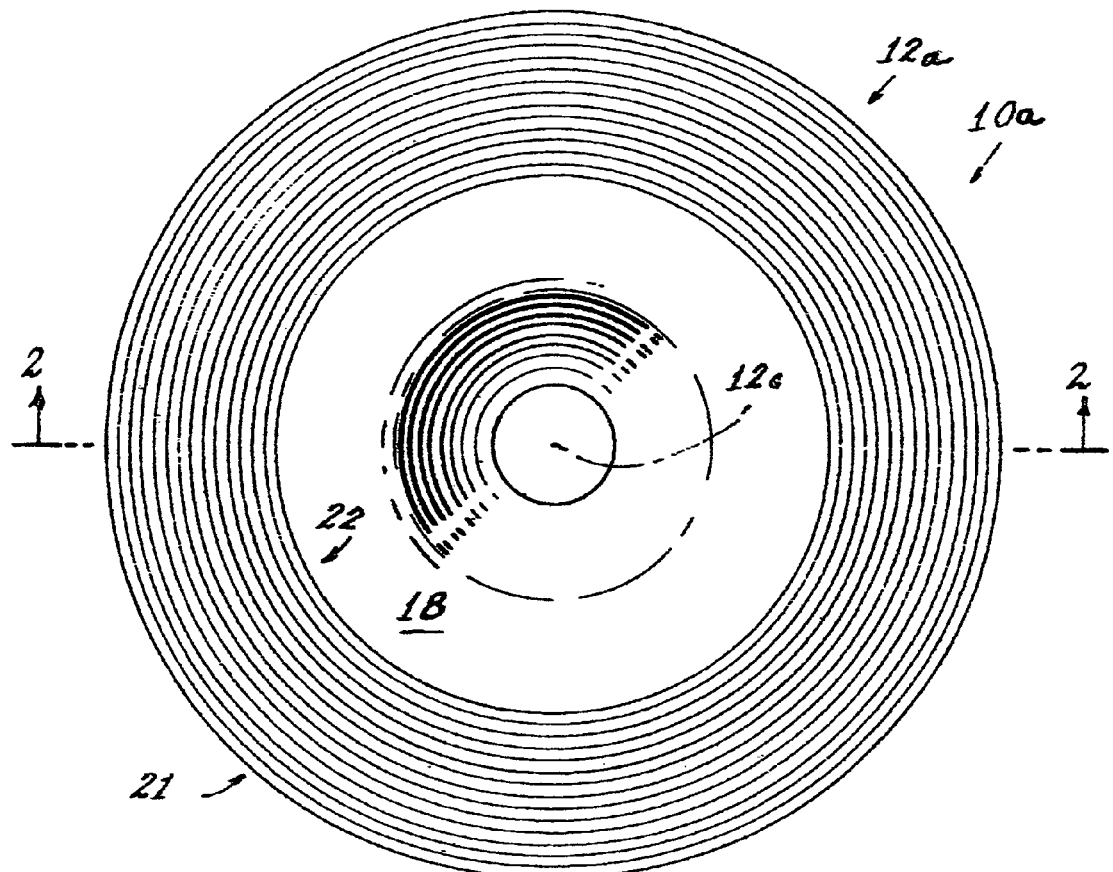
FIG. 1 is a plan view of an un-segmented optic.
Figure 2:
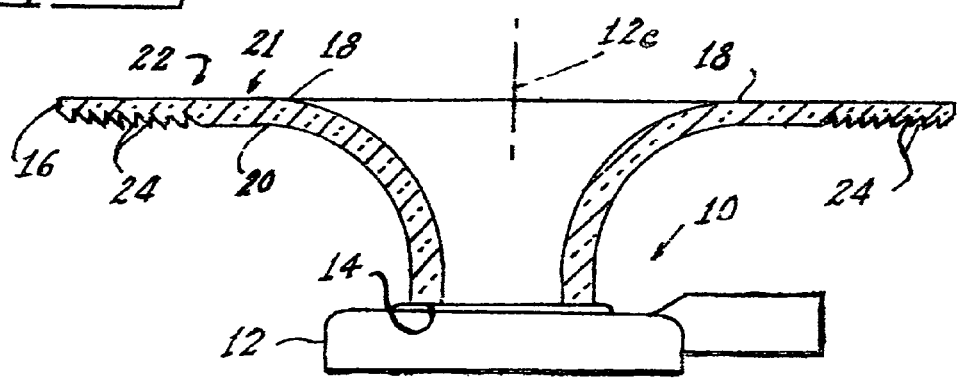
FIG. 2 is a sectional view taken along the line 2-2 of FIG. 1.

The base 32 includes a light input window 40. In a preferred embodiment of the invention the input light source associated with the window would be supplied by a light emitting diode lamp, such as that shown at 10 in FIG. 2; however, other light sources can be employed with the invention As shown in FIG. 3 the N light-emitting segments 38 form a section of a circle when viewed transverse to the longitudinal axis 36; however, this is exemplary and the actual configuration, as stated above, will depend upon the curvature of the underlying surface with which the optic is being used.

Each of the segments 38 comprises a distal end 42, a front side 44 and a rear side 46 and these sides can be provided with distinctive optics. For example, as shown, the rear side 46 includes a plurality of triangular steps 48 using total internal reflection to reflect a portion of the light towards the front side. The front side 44 includes a plurality of refractive features, such as pillow optics 50. In the interest of clarity only one segment 38 is shown with the pillow optics in FIG. 3.

There is thus provided an optic suitable for many applications where the underlying feature comprises a complex curved surface. A prime example of such use would be for a taillight assembly for a motor vehicle, which often utilizes complex curvature in the taillight area of the vehicle.

While there have been shown and described what are at present considered to be the preferred embodiments of the invention, it will be apparent to those skilled in the art that various changes and modifications can be made herein without departing from the scope of the invention as defined by the appended claims.

What is claimed is:

1. An optical light guide comprising:
    a base;
    a body extending from said base along a longitudinal axis; and
    N rigid light-emitting segments extending laterally from said body, at least some of said N segments being spaced a different distance from said base.

2. The optical light guide of Claim 1 wherein each of said N segments is spaced a different distance from said base.

3. The optical light guide of Claim 1 wherein said base includes a light input window.

4. The optical light guide of Claim 1 wherein said N rigid light-emitting segments form a section of a circle when viewed transverse to said longitudinal axis.

5. The optical light guide of claim 1 wherein said segments each comprise a distal end, a front side and a rear side.

6. The optical light guide of claim 5 wherein said rear side includes a plurality of triangular steps, which use total internal optics to reflect a portion of the light towards said front side.

7. The optical light guide of claim 6 wherein said front side includes a plurality of refractive features.

8. An optical light guide for a vehicle lamp assembly, said light guide being adapted to conform to a complex curvature formed in said vehicle comprising:
    a base;
    a body extending from said base along a longitudinal axis; and
    N rigid light-emitting segments extending laterally from said body, at least some of said N segments being spaced a different distance from said base, whereby said light guide substantially matches said complex curvature formed in said vehicle.

* * * * *